United States Patent

Johnson et al.

[11] Patent Number: 5,832,262
[45] Date of Patent: Nov. 3, 1998

[54] REALTIME HARDWARE SCHEDULER UTILIZING PROCESSOR MESSAGE PASSING AND QUEUE MANAGEMENT CELLS

[75] Inventors: Christopher T. Johnson, Endicott; John D. Bezek, Owego, both of N.Y.

[73] Assignee: Lockheed Martin Corporation, Bethesda, Md.

[21] Appl. No.: 528,267

[22] Filed: Sep. 14, 1995

[51] Int. Cl.⁶ .................................................. G06F 9/00
[52] U.S. Cl. ................................. 395/672; 395/670
[58] Field of Search ........................... 395/672, 674, 395/670, 200.38; 711/100, 171; 370/394, 236

[56] References Cited

U.S. PATENT DOCUMENTS

| | | | |
|---|---|---|---|
| 4,805,107 | 2/1989 | Kieckhafer et al. | 395/182.02 |
| 5,237,565 | 8/1993 | Henrion et al. | 370/236 |
| 5,278,828 | 1/1994 | Chao | 370/394 |
| 5,301,192 | 4/1994 | Henrion | 711/100 |
| 5,428,781 | 6/1995 | Duault et al. | 395/672 |
| 5,600,820 | 2/1997 | Johnston | 711/171 |
| 5,610,841 | 3/1997 | Tanaka et al. | 395/200.49 |

*Primary Examiner*—Majid A. Banankhan
*Attorney, Agent, or Firm*—Peter Eric Rosden

[57] ABSTRACT

This invention discloses a hardware manager and scheduler device which can be implemented within a distributed operating system. The scheduler replaces software synchronization and interaction with two unit-level hardware units that facilitate task scheduling. These units utilize global machine memory to manage scheduling queues using a simple algorithm. The "tasks" managed may be programs requiring execution by a processor, other shared system resources that must be cooperatively scheduled, or input/output queues through system peripheral connections. One unit manages tasks waiting to be executed while the other unit manages tasks which have been completed. Each unit reads and writes pointers to task control blocks stored in a shared memory into and from one or more circular memory queues stored separately in the shared memory. Each queue may correspond to a particular task priority and may be separately managed by the device of this invention.

10 Claims, 8 Drawing Sheets

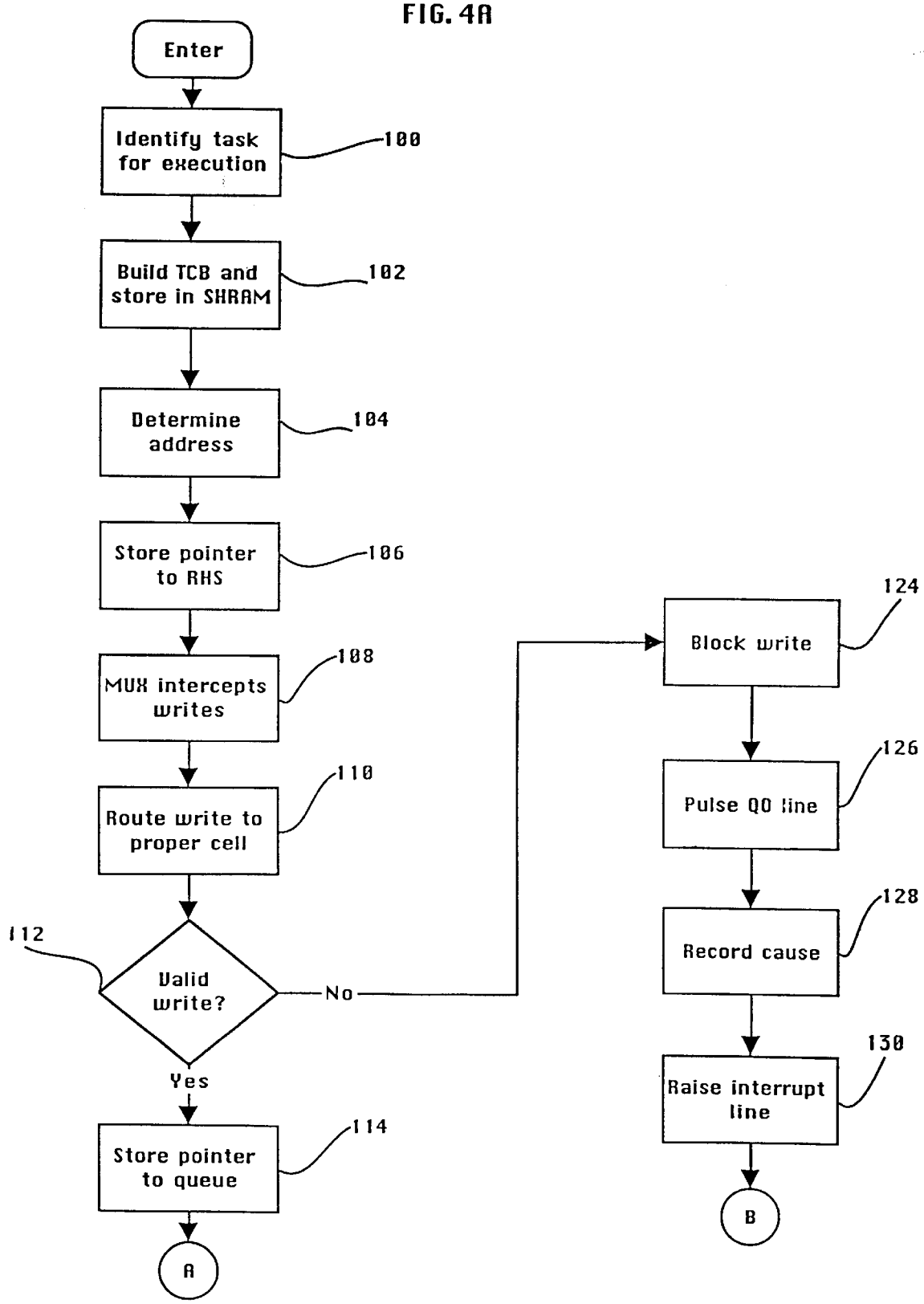

REALTIME HARDWARE SCHEDULER UTILIZING PROCESSOR MESSAGE PASSING AND QUEUE MANAGEMENT CELLS

TECHNICAL FIELD

The subject invention generally relates to task and event scheduling and synchronizing in data processing systems which handle multiple processes.

BACKGROUND OF THE INVENTION

Computer systems which deal with multiple, different processes, regardless of whether such systems are configured as multiprocessing, loosely coupled or shared memory systems, must incorporate a method for synchronizing and scheduling these disparate tasks. Ideally, this method should be simple, flexible and use a minimum amount of central processor resources, memory space, computing time and physical space within the computer.

In order to accomplish task management in a multiprocessor, distributed computing architecture of tightly coupled processors, queuing mechanisms between the processes executing on the processors is required. In current computing systems this requires that a task or individual processor unit is made responsible for ordering, scheduling and managing individual tasks or processes. This same scheduling processor (SP) must also manage the scheduling queues and synchronize the processors. This problem has usually been solved by reliance on complicated software methods involving such queuing techniques as searching through scheduling tables and separately loading each available location. Such system management accounts for a large overhead in the SP and decreased overall system performance. These methods can also be complex and often consume a large amount of otherwise usable system resources including memory space and computing time.

Even when hardware has been used to assist in task scheduling in the prior art, these same problems have persisted. For example, the patent to Chao, U.S. Pat. No. 5,278,828, discloses a queue management method and system in which each data item is assigned an "id" number that is stored in a sequencer after other preexisting items at the appropriate priority level have been shifted to provide space for the new item. Although this invention is a significant improvement over the prior art, the shifting process can consume a large amount of time and, in addition, raises the possibility that sequencer data could be lost after having been shifted left or right in the sequencer memory, effectively resulting in a logical over- or under-flow. The patent to Cox et al., U.S. Pat No. 4,387,427, discloses a hardware scheduler which discriminates between the types and functions of queues thereby causing certain processes to be preempted or suspended. While this system has advantages under certain circumstances, it is also complex and does not handle all queues uniformly. Some hardware task schedulers, such as that disclosed in the patent to Peaslee et al., U.S. Pat. No. 5,265,203, require instruction decoding and instruction-level management which is again more complex and time-consuming than might be desired for many real-time applications. Other hardware schedulers, such as that disclosed in the patent to Belo, U.S. Pat. No. 5,379,428, limit the number of processes scheduled to a particular priority level by the amount of hardware implemented in the system and further require time-consuming encoding and decoding of bit strings in order to determine the level of process that is scheduled in an input register.

Other problems encountered by task schedulers are flexibility and adaptability. For example, one method of managing multiple tasks involves the use of circular queues. This type of arrangement is particularly useful when there are more task requests than can be handled simultaneously, as discussed in IBM Technical Disclosure Bulletin, Vol. 35, No. 6, Nov. 1992, p. 469. However, such arrangements are handicapped where they require that each circular queue have assigned to it a separate digital processor. Other task schedulers are severely limited by the inability to permit more than one element to exist on a priority queue at one time, as in IBM Technical Disclosure Bulletin, Vol. 31, No. 3, August 1988, p. 41.

There is, therefore, a need for a task schedule manager which is simple, fast, accurate, flexible and adaptable and which can simultaneously handle multiple circular queues.

SUMMARY OF THE INVENTION

The present invention is a hardware-based device for scheduling, managing and synchronizing multiple tasks or events in a data processing system. The tasks or events managed may include, but are not limited to, programs requiring execution by a processor, other shared system resources that must be cooperatively scheduled and input/output queues presented through system peripheral connections. The device can be implemented in separate physical integrated circuit (IC) chips or as part of another IC and can be implemented in a distributed operating system. Management of scheduling queues is simplified in a distributed computing system by use of a global machine memory.

The device of this invention needs minimal additional logic and memory, thereby limiting the physical space which is occupied on a computer's printed circuit boards. Task management is implemented simply so as to reduce processing overhead and improve execution speed. Since an independent hardware solution to task management problems is presented by the system of this invention, there is minimal adverse effect on a computer's operating system. Use of the device of this invention is advantageous for any type of queuing operation due to increased speed, thereby making it especially advantageous for those doing real-time applications such as simulations, communication monitoring and switching.

According to the present invention, a realtime hardware scheduler is implemented which works in conjunction with a scheduling processor to manage multiple tasks or events to be executed by one or more other processors. This scheduler manages one or more circular FIFO queues in a shared memory through two realtime hardware scheduling units, one of which manages tasks awaiting execution and the other of which manages tasks which have been completed. Each of the queues may correspond either to a particular designated priority level of tasks or to a specifically designated device or application to which the tasks relate. The scheduling processor acts on requests to schedule new tasks by building a task control block and storing that block in the shared memory at a particular memory location. A pointer to that location is then transmitted by the scheduling processor to the realtime hardware scheduler of this invention. The scheduler includes one or more cells, each of which may correspond to a particular priority level matching a similar priority level of one of the circular FIFO queues in shared memory. In addition, the scheduler includes a combinatorial select logic unit which receives the pointer data from the scheduling processor, determines its priority level and directs that data to the cell corresponding to that priority level. If the cell is set to operate in a parallel mode, it may then write the pointer data to the circular task queue in shared memory which has the same priority level as that cell. However, if the cell is set to operate in a serial mode, the pointer data is written to a task queue associated with a specified device or application. After storing the pointer, the cell performs a test to validate the write operation and restores itself and the circular queue to their previous states if the write operation is shown to be invalid. One of various slave processing modules periodically checks the scheduler to determine if there are any tasks awaiting execution. If so, it may retrieve a pointer to the location in shared memory of such tasks from the scheduler. The slave processor then uses that pointer to further access a different area of the shared memory to retrieve the actual task, executes that task and notifies the scheduler of task completion. The scheduling processor also periodically checks the scheduler to ascertain whether any tasks have been completed. If so, it retrieves those tasks through information provided by the scheduler from shared memory and provides whatever further servicing of them is required.

It is a primary objective of this invention to provide a task scheduler for a multitasking computer system which is implemented in hardware and may be included as part of a microprocessor chip.

An additional objective of this invention is to provide a task scheduler in which a scheduling processor need not perform many of the operations typically associated with managing task execution and completion.

It is a further objective of this invention to provide a task scheduler for a computer system which minimizes the amount of memory and logic required for implementation and requires few changes to a computer's operating system in order for its use to be initiated.

It is yet another objective of this invention to improve the speed with which tasks related to realtime applications, such as simulations, communications, monitoring and switching operations, are completed through a task scheduler which manages tasks and events by means of hardware-directed memory operations.

It is still another objective of this invention to improve the speed and efficiency of all types of queuing operations by providing a hardware-based manager of circular memory queues.

Yet an additional objective of this invention is to provide a realtime hardware scheduling unit which can operate in either a parallel or a serial mode in conjunction with storing and retrieving information related to tasks awaiting execution and those completed, thereby enabling the scheduler to retrieve such information either based on the priority of the task or on a predetermined association between the task and a particular application, process or device.

It is another objective of this invention to provide a task and queue managing device which handles all tasks and queues uniformly.

Another objective of this invention is to enable a task manager to be flexible and adaptable enough to handle queues including multiple tasks of different priorities wherein the number of elements in each queue is variable and limited only by the available memory space while different queues may simultaneously handle different numbers of elements.

A further objective of this invention is to provide a task manager in which task queues may be established either based on the priority level of tasks stored in the queue and/or based on an association of the queue with a particular device, procedure or operation.

An additional objective of this invention is to improve the speed and flexibility of task and event scheduling in a distributed multiprocessing system.

BRIEF DESCRIPTION OF THE DRAWINGS

The foregoing and other objects, aspects and advantages of the invention will be better understood from the following detailed description of the invention with reference to the drawings, in which.

DESCRIPTION OF THE PREFERRED EMBODIMENT

Figure 1:
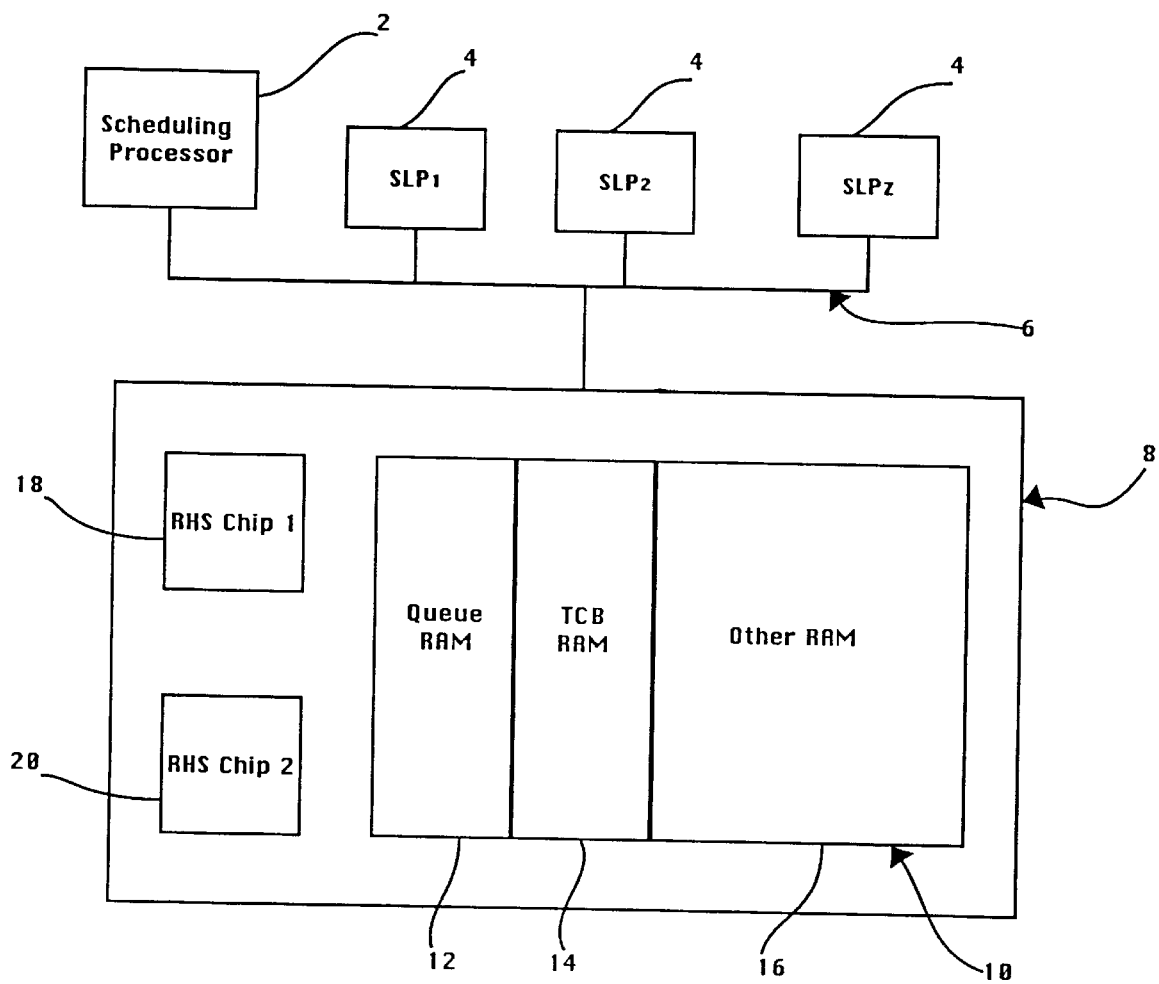
FIG. 1 is a block diagram showing a preferred implementation of the novel realtime hardware scheduler of this invention in a multitasking, distributed computer system.

For a more detailed understanding of the invention, reference is first made to FIG. 1 of the drawings. This figure illustrates in block diagram form an example of a computer system configured to use this invention in the context of a multitasking, distributed multiprocessing system in a preferred embodiment. Shown are several processing modules which may or may not contain local memory. One of these processing modules functions as a scheduling processor (SP) 2, while the remaining processing modules function as slaves 4 ($SLP_1$, $SLP_2$ ... $SLP_z$) to SP 2. All of the processing modules are interconnected via a bus structure 6 which also connects each of them to a shared global memory array (SGMA) 8.

The SGMA 8 includes a shared memory (SHRAM) 10 which is divided into a process task queue RAM area 12 containing multiple circular first-in-first-out queues, a task control block (TCB) RAM area 14 for storing data structures that contain details about a task to be executed or currently executing and a remainder RAM area 16 available for use by the various processing modules for various purposes such as data storage, or inter-process or inter-processor communication. The advantages available through the use of this invention are achieved by the inclusion of two realtime hardware scheduling (RHS) units 18 and 20 as part of SGMA 8. RHS unit 18 functions as a "tasks awaiting processing" queue manager, while RHS unit 20 functions as a "tasks completed indicator" queue manager which together relieve SP 2 from much of the work associated with managing task schedules.

When SP 2 identifies a task, $T_x$, to be executed or currently executing, it builds a TCB associated with $T_x$ and stores that TCB into TCB RAM area 14. SP 2 then stores a pointer to this TCB into the queues managed by RHS unit 18. This is accomplished by writing a pointer to the TCB memory location to RHS unit 18 which then determines where in task queue RAM area 12 the pointer should be written. In the implementation of the invention shown in FIG. 1, the realtime hardware scheduling units are configured to operate in a parallel mode, as will be discussed in greater detail below, which is the only mode in which priorities are used to order tasks. Consequently, the queues in task queue RAM area 12 are assigned various priorities "p". Task, $T_x$, also has a priority level "p" at which it is operating. RHS unit 18 ascertains the priority level of the task and then writes the pointer to that task into the queue in task queue RAM area 12 having a matching priority level. Task $T_x$ would be assumed to be successfully scheduled if no interrupt, such as queue full, occurs after the write activity has been completed.

SP 2 then performs a read of RHS unit 20 testing the return value to determine if any pending completed tasks exist. RHS unit 20 is written by the slave processing modules 4 to indicate to SP 2 that the task they were executing has completed. If completion events are pending in RHS unit 20, SP 2 reads the completion acknowledgment notice by reading the queue in task queue RAM area 12 through RHS unit 20. SP 2 will continuously schedule tasks into RHS unit 18, assuming tasks are ready for execution, and then service the completion notifications from RHS unit 20 by, for example, returning a processed value, displaying an object or initiating a new, related task.

The other slave processing modules 4 continuously poll RHS unit 18 in search of available tasks. They receive notification of tasks to process by this method. When a task is available for execution, a slave processing module 4 accesses RHS 18 to obtain a pointer to the location of the TCB for the particular task in task block RAM 14, retrieves the TCB and executes and services the task. Processing completion is signaled by updating the TCB with the results, storing that TCB back into task block RAM 14 and "scheduling" a completion notification, associated with the TCB, in RHS unit 20 by storing a pointer to the completed TCB in the appropriate queue.

Figure 2:
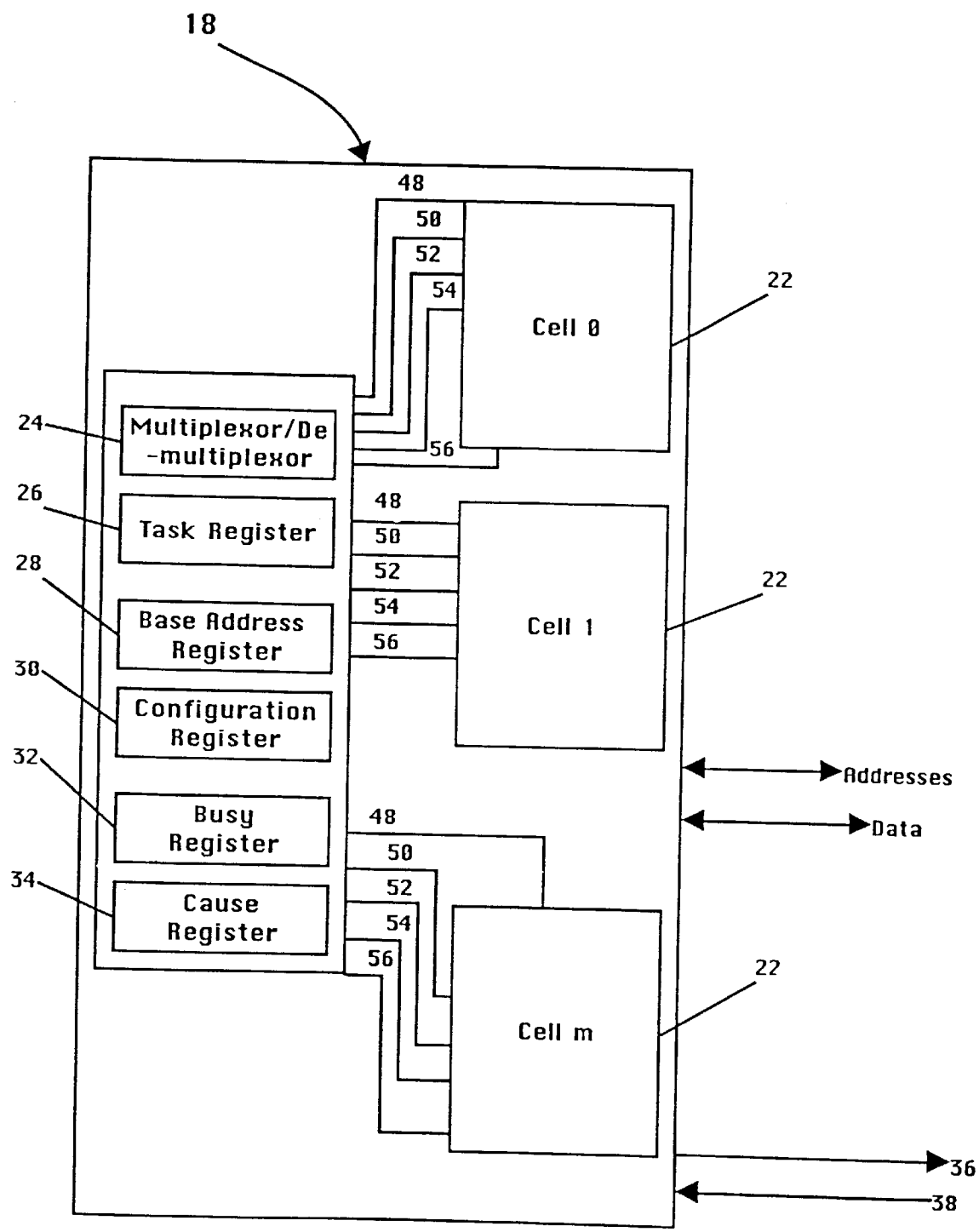
FIG. 2 provides a block diagram showing the configuration of a realtime hardware scheduling unit.

For a better understanding of the functioning of the RHS units 18 and 20 in conjunction with SHRAM 10, reference is now made to FIG. 2 which presents in block form a diagrammatic illustration of the functional elements of, for example, RHS unit 18. Each RHS unit is a hardware device implemented with simple circuitry which is used to manage one or more circular scheduling queues located in the process task queue RAM area 12 of SHRAM 10. Each RHS unit is comprised of various operational and status registers, routing logic and a set of queue management cells 22, each of which is associated with a unique circular queue residing in the task queue RAM area 12 of SHRAM 10. The association between an individual cell 22 and a queue is based on priority levels when the cell is operating in a parallel mode but is based on a predetermined relationship to, for example, a particular input device when the cell is operating in a serial mode, as discussed below. Communication between the RHS units and SHRAM 10 occurs by means of interconnecting data and address lines. Each unit manages a set 1 . . . m of circular first-in-first-out (FIFO) queues. Generally, the number "m" is set to some power of 2 (i.e., 4, 8, 16, . . . 2m). This number is fixed at design time and depends on such factors as the unit size and design rule size. However, the concepts disclosed in this specification are extensible and do not depend on a particular number of cells in the implementation of an RHS unit. Each queue has "n" elements. When operating in the parallel mode, each of these queues corresponds to one priority level for scheduling tasks when its corresponding cell is operating in a parallel mode, as shown in FIG. 1. The relative importance of a task within the scheduling system is its priority. Higher priority tasks are executed before lower priority tasks. The queue onto which a task is placed is determined by that task's priority. For each task, SP 2 builds a TCB for that task and stores that TCB in task block RAM area 14 in SHRAM 10. When a task at priority level "p" is to be scheduled for execution, SP 2 requests that RHS 18 schedule that task at the proper priority level by storing a pointer to that TCB into the queue in shared memory having the corresponding priority. The pointer is added to the queue by performing a write operation to RHS 18 which uses the task's priority level "p" as an index to select cell "p" on RHS 18. Cell "p" manages circular queue "p" in the task queue RAM area 12 of SHRAM 10, causing the pointer to be placed into the queue managed by Cell "p". For example, with reference to FIG. 2, cell 1 in RHS 18 would manage queue 1 in SHRAM 10. To obtain a task for execution, a read request is made to RHS 18 by one of the slave processor modules 4. RHS 18 maintains a record of the highest priority task available for execution in the queues. The read is routed to the cell 22 having that priority. The cell proceeds to access a memory location in the circular queue with which it is associated to fetch and return the contents of that memory location which is a pointer to a TCB stored in the TCB RAM area 14. The slave processor 4 then uses that pointer to retrieve the TCB from shared memory and to service the task. The cells manage the queue pointers internally.

After completing a write transaction to RHS unit 18, SP 2 would initiate a read of RHS unit 20 to see if any tasks had been completed using the same procedure as described above. If there were completed transactions, RHS 20 would return the pointer to the completed TCB from the respective task queue RAM area 12 in shared memory through RHS unit 20, thereby enabling SP 2 to retrieve the TCB of the completed task from task block RAM area 14 in the shared memory and service that task by, for example, returning its value, writing it elsewhere or initiating another related task. After completing a read transaction from RHS unit 18 and processing a task, the respective slave processing module (SLP) 4 updates the TCB in task block RAM area 14 in shared memory changing the status of the TCB to indicate completion. The slave processing module 4 then causes RHS unit 20 to schedule the task at the proper level by storing a pointer to the completed TCB in the proper queue managed by RHS unit 20 thereby facilitating the notification of SP 2 just described of the existence of completed transactions.

It is estimated that the time elapsed for any individual read or write transaction completed by an RHS unit would be less than twenty machine cycles in any practicable configuration of cells. This speed represents a substantial improvement over other known systems performing similar functions.

Each RHS unit includes routing logic in the form of multiplexor/demultiplexor (MUX) 24 which intercepts all reads and writes to the address range of the memory queues and routes them to the corresponding cell 22. Each RHS unit also includes five internal registers which cooperate with MUX 24 in various ways in routing task read and write requests depending on the mode in which the RHS unit is functioning. The task register 26 is read to retrieve the highest priority available task when the RHS unit is in parallel mode. The base address register 28 contains the starting memory address of the address space of a queue. The configuration register 30 is used to determine the mode in which the unit is to operate (serial or parallel), the type of interrupt to furnish (pulsed or latched) and the size of the individual queue memory, specifically "n" for each queue. This size "n" is used to compute the address range of each queue which MUX 24 intercepts and decodes. The range of a queue extends between its starting memory address and its stopping memory address which is defined as: start address+

(number of cells (m+1)*n). Although the preferred embodiment of FIG. 2 implements configuration register 30 outside of the cells 22, in which case its contents would apply to all cells, this register could also be implemented separately and independently within each cell 22, thereby allowing that cell's operating mode to vary independently from that of other cells or in a configuration controlling groups of cells 22 with differing modes of operation. The busy register 32 is used only in serial mode and is then used to determine which cells 22 have pending tasks. The bits in the busy register 32 are bit-mapped to corresponding cells 22 and are set by the logic of MUX 24. The cause register 34 is used to report the cause of a fault or interrupt on the RHS. Interrupts are signaled from the RHS unit on interrupt line (INT) 36. Such interrupts may be level triggered or latched and may be implemented with external logic. Each RHS unit also includes a standard reset line 38 which can be activated, for example, on power-up, when a glitch is detected or when a clear operation is desired.

Figure 3:
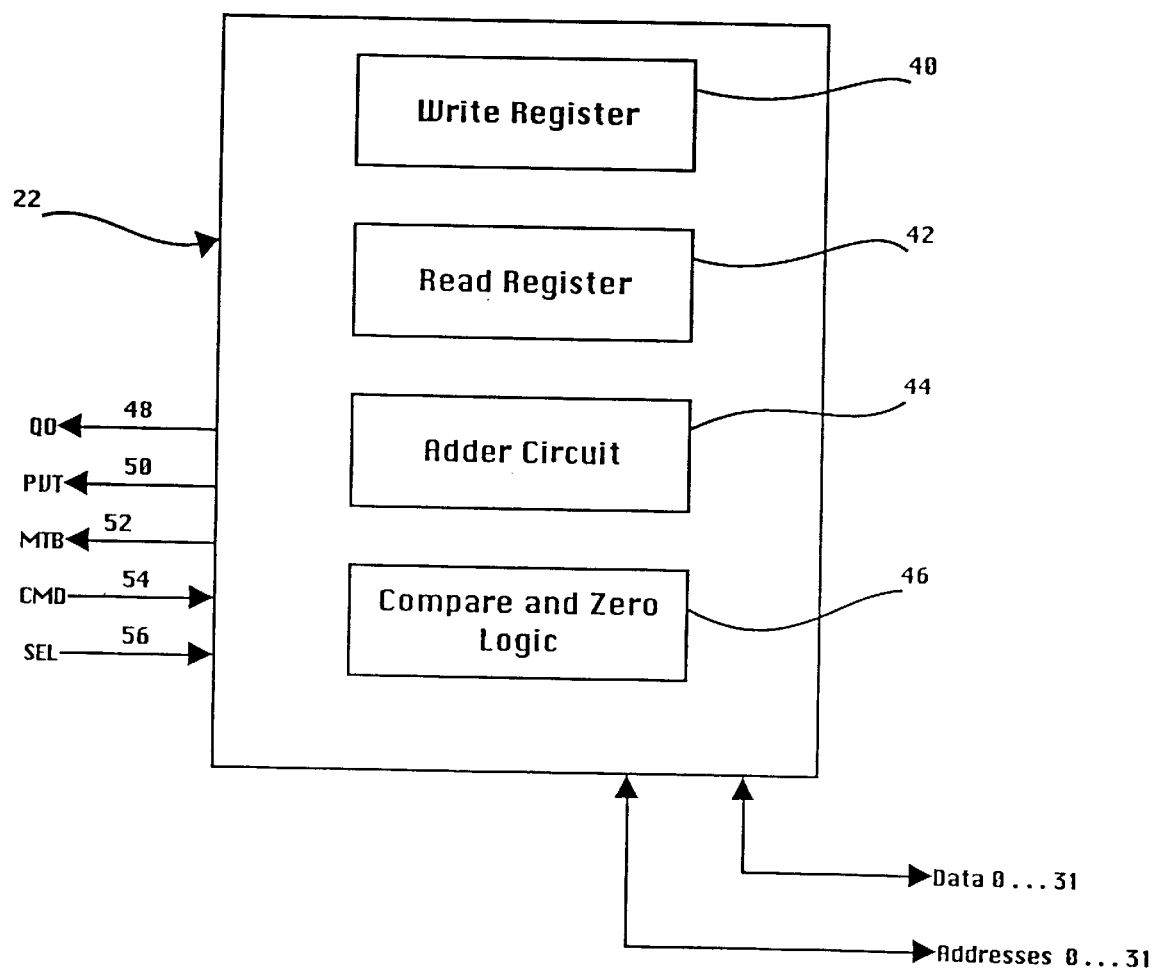
FIG. 3 is a block diagram showing the configuration of a single cell within a realtime hardware scheduling unit set up for 32 bit addressing.

The functional elements of each cell 22 may be better understood by reference to FIG. 3 which shows these components in block form in the context of a cell designed for thirty-two bit addressing, although such cells may be designed for addressing of a lesser or greater capacity. The contents of write register 40 point to the next available opening in the address space of the memory queue that this particular cell 22 is managing. The contents of read register 42 point to the next available task in the address space of the memory queue that this particular cell 22 is managing. Each cell also includes an adder circuit 44 and a compare and zero logic 46, the functioning of which will be discussed below.

Three output and two input lines are associated with each cell 22. When the queue corresponding to that cell has overflowed, QO line 48 signals that condition. Although each cell has a discrete QO line 48, these lines are delivered together as an aggregate signal line to indicate that a current write request would overflow a queue. If there is at least one valid task waiting in the circular queue managed by a cell, the presence of a valid task is shown on PVT line 50. Again each cell has a discrete PVT line 50 which is examined together with the lines from other cells as an aggregate signal line to indicate the presence of a queued task anywhere in the queues managed by the respective RHS unit. Finally, the MTB line 52 indicates the existence of an empty buffer in the cell. The two input lines to the cell include a command line (CMD) 54 which is active for a read operation and inactive for a write operation, and a select line (SEL) 56 which is used by cell 22 to determine whether the operation on the CMD line 54 is designated for it. All of these lines, although shown individually as single lines in FIGS. 2 and 3, include sufficient lines to handle each of the signals from the corresponding number of cells. The functioning of all of these lines will be further explained below.

Compare and zero logic 46 performs several functions. The first function is to compare the contents of read register 42 and write register 40. If the contents are not equal, PVT line 50 is allowed to remain active, signaling a valid task is present and the MTB line 52 is allowed to remain active. If the contents are equal, the compare and zero logic 46 causes MTB line 52 and PVT line 50 to go inactive. The second function is to check all writes to the address space of the specific memory queue managed by the cell. This logic pre-increments the contents of write register 40. If the contents are equal, the logic causes QO line 48 to go active for a predetermined number of cycles, long enough for cause register 34 to latch the event and raise the interrupt line 36 which would be monitored, for example, by a writing device. The last function of the compare and zero logic is to keep track of the upper and lower boundary of the address space for the memory queue managed by the cell. The lower boundary is defined as: [contents of base address register 28+((cell number)*(size of memory queue as determined by the contents of configuration register 30)]. The upper boundary is defined as: [lower boundary+size of memory queue as determined by the contents of configuration register 30]. When a read or write is performed, adder circuit 44 increments the contents of the respective register. If the result of the increment is greater than or equal to the upper boundary, the register is loaded with the lower boundary by compare and zero logic 46.

Figure 4B:
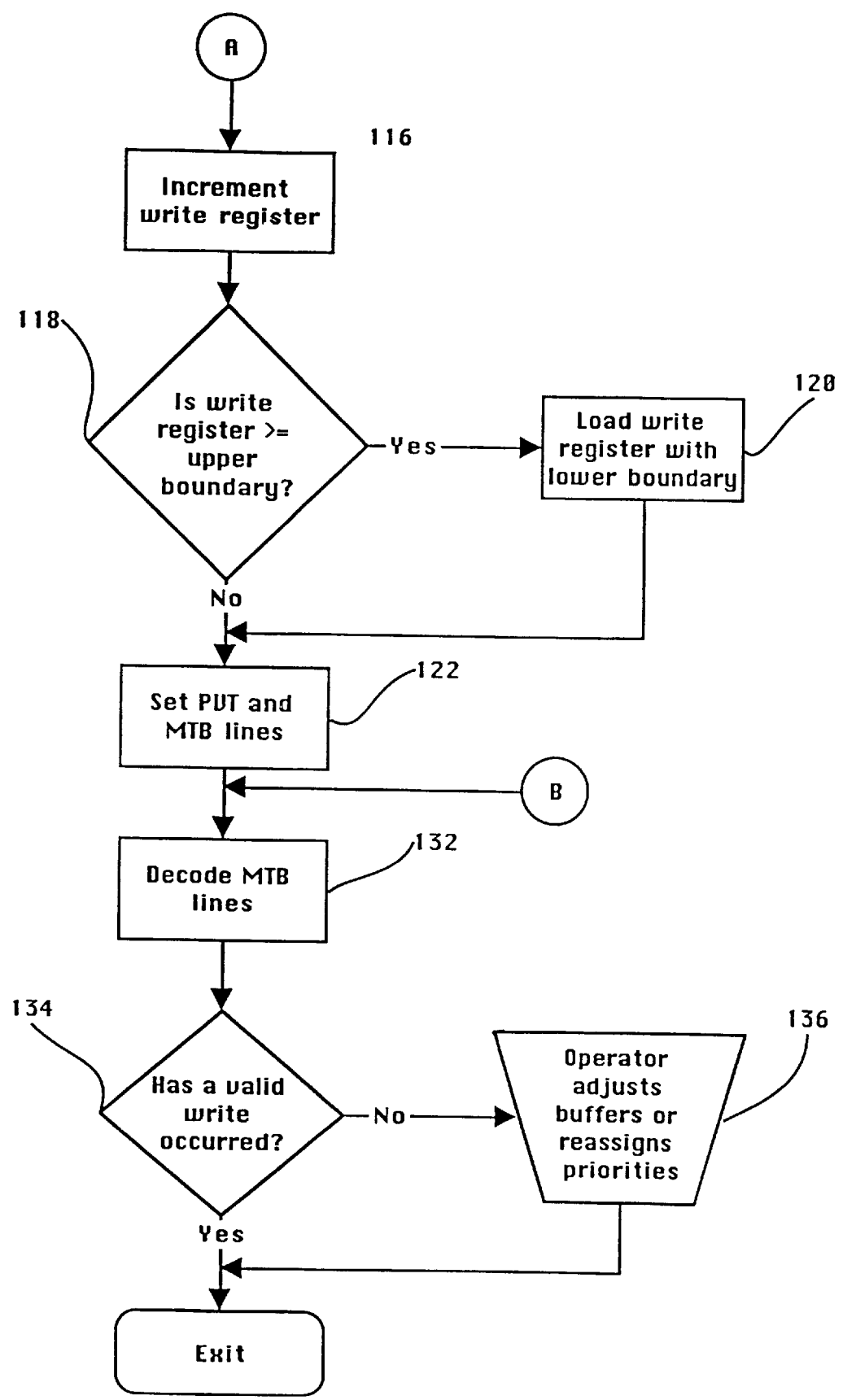
FIG. 4A, B is a schematic flowchart depicting the data processing, storage and operations invention for a write operation.

The functioning and interrelationship of the elements of an RHS unit with a processing module in regard to a write operation are illustrated by reference to the data storage and processing steps shown in the flow chart of FIG. 4. The steps described below relate specifically to a write operation by scheduling processor (SP) 2 to realtime hardware scheduling unit (RHS) 18, although analogous functional steps are undertaken by a slave processing module 4 when it writes to RHS 20. As an analysis of the flow chart will show, a primary advantage of the invention is that much of the work in such a write operation is undertaken by the RHS unit. Thus, only steps 100 to 106 and 134 involve work by a processing module, while all of the remaining processing steps are performed by an RHS unit. A primary function of SP 2 is to seek out and identify tasks having a priority level "p" which need to be executed. After such a task has been found at step 100, the SP 2 must build a TCB and store it into SHRAM 14 at step 102. SP 2 then determines the address of the memory space for the queue into which the pointer for this TCB is to be stored at step 104 using the following formula in the case of operation in parallel mode:

queue address=base address for queue+(Priority "p"* size of queue memory space)

If a serial mode of operation is in effect, the address is calculated by substituting the cell number for the priority "p" in the above formula. Pointers to queue memory space are staticly defined in a table. The SP then stores the pointer to the TCB to this computed address in step 106 by writing it to RHS unit 18. The multiplexor 24 of the RHS unit intercepts each write to the address space of any queue at step 108 and routes it to the cell 22 which is associated with that queue at step 110. The cell 22 determines that it is a write operation, and validates the results of the write before letting the operation complete at step 112. If the contents of write register 40 plus an increment provided by adder circuit 44 do not equal the contents of read register 42, a valid write exists, and the following events occur. The pointer to the TCB is stored at the memory space in the queue pointed to by write register 40 at step 114 and the contents of write register 40 are incremented by adder circuit 44 at step 116. The compare and zero logic 46 compares the output of the add operation to the upper boundary at step 118 and if it is greater than or equal to the upper bound, the write register is loaded with the lower boundary at step 120. The PVT line 50 and the MTB line 52 are set (or allowed to remain) active at step 122. If the contents of write register 40 plus the increment provided by adder circuit 44 are equal to the read register 42 at step 112, an invalid write has occurred and the following events take place. The store of the TCB pointer to the memory space in the queue is blocked at step 124. Compare and zero logic 46 pulses the QO line 48 at step 126 to active and then inactive states. Finally, cause register 34 records the transition of QO line 48 at step 128 and activates the interrupt line 36 at step 130. Next, if the serial mode is in effect, multiplexor logic 24 decodes the MTB lines 52 from the cells 22 and sets the appropriate bit in the busy register 32, whereas, if the parallel mode is in effect, multiplexor logic 24 decodes the MTB lines 30 from the cells 22 and determines the highest priority. That cell number is stored in task register 26 and is used for the next read operation. These operations are performed at step 132. A separate determination is then made by SP 2 at step 134 whether a valid write has occurred. If so, the write operation is completed and the procedure is exited. If not, the queue is full at this priority or mapped address space. This is an abnormal condition. Since the size of the memory buffers are configurable, either more buffer space needs to be allocated or priorities need to be reassigned to different tasks. Both of these conditions are addressed by a manual interface at step 136.

After SP 2 has performed a write operation to RHS 18, it initiates a read operation to RHS 20 in order to determine whether there are any tasks which have been completed and enqueued in the task queues managed by that unit. Analogously, after a slave processor 4 has executed a task and performed a write operation to RHS 20 informing it of completion of the task, it initiates a read operation to RHS 18 in order to determine if there are any tasks awaiting execution in that unit.

Figure 5A:
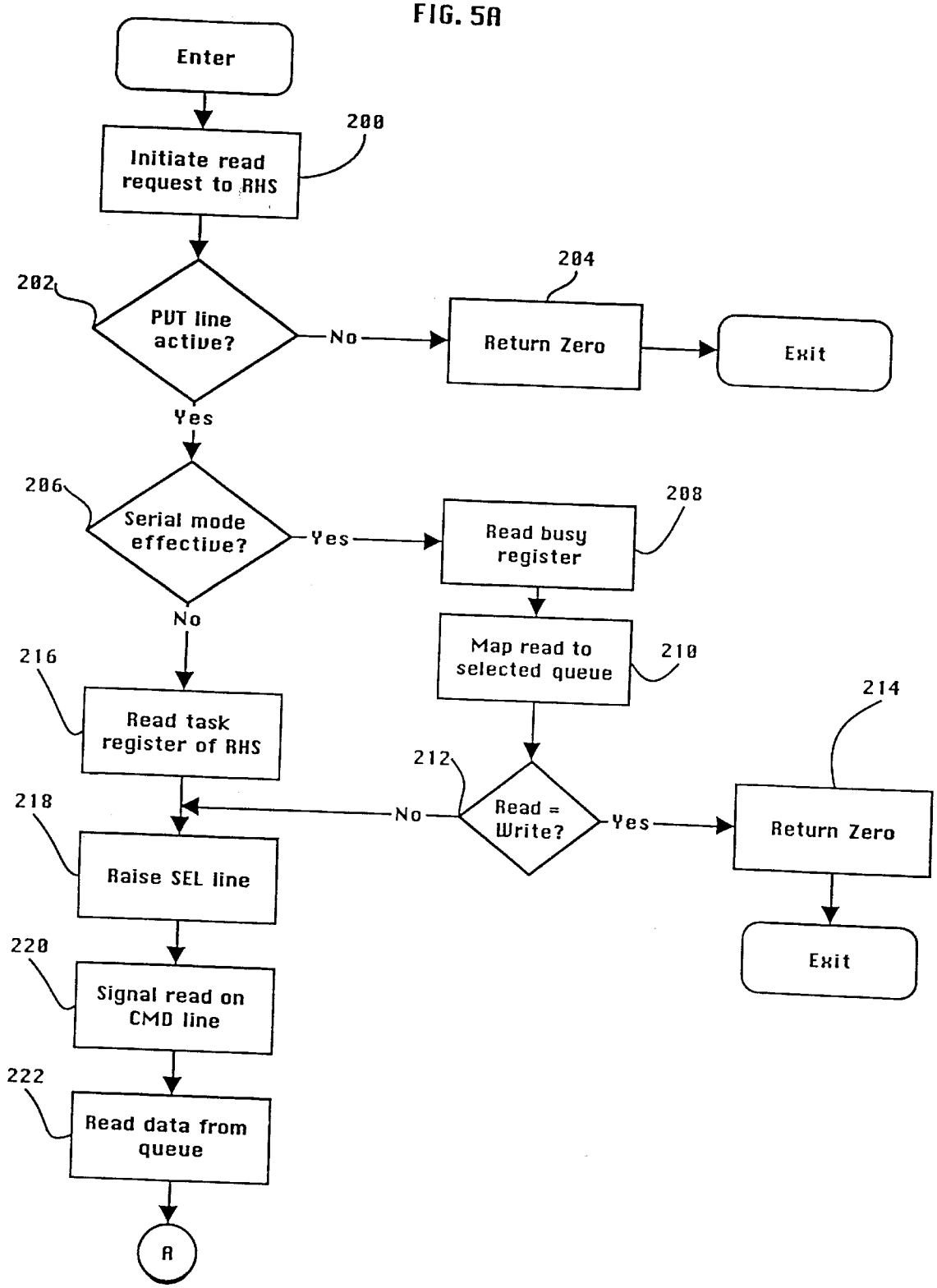
FIG. 5A, B, C is a schematic flowchart depicting the data processing, storage and operational steps of the invention for a read operation.
Figure 5B:
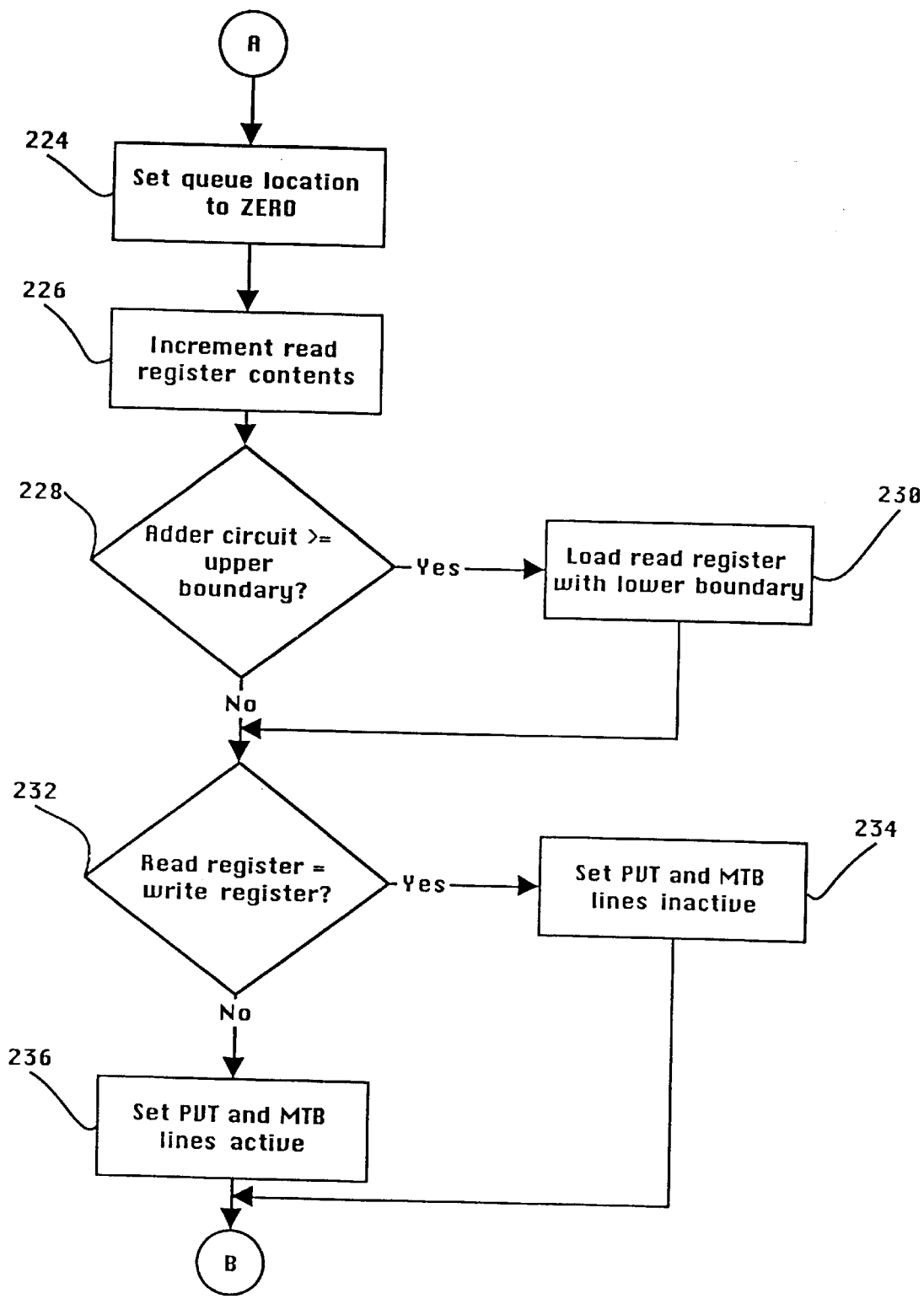
Figure 5C:
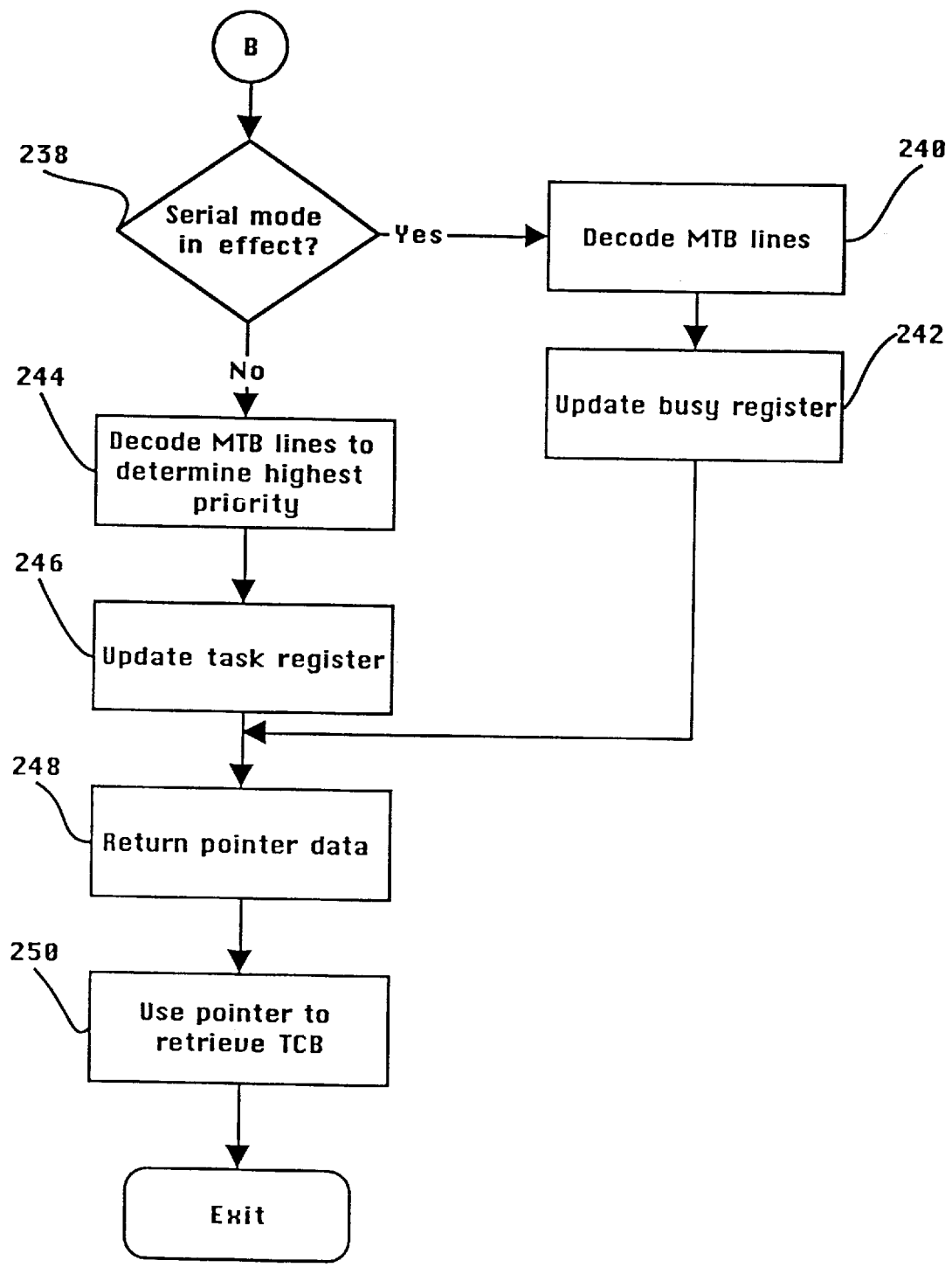

The functioning and interrelationship of the elements of an RHS unit with a processing module in regard to a read operation are illustrated by reference to the data storage and processing steps shown in the flow chart of FIG. 5. The steps described below relate specifically to a read operation by slave processing module 4 to RHS 18, although the same functional steps are undertaken by SP 2 when it reads from RHS 20. As with a write operation, an analysis of the flow chart will show that a primary advantage of the invention is that much of the work in such a read operation is undertaken by the RHS unit. Thus, only steps 200 and 250 involve work by a processing module, while all of the remaining steps are performed by an RHS unit. When an SLP wants to retrieve a task for execution, it initiates a read request at step 200 to RHS 18 in order to retrieve a pointer to the location of a task awaiting execution in SHRAM 10. First, the PVT line 50 is tested at step 202 within the RHS unit to see whether there are any valid tasks awaiting execution. If not, a zero is returned to the requesting SLP at step 204, regardless of whether the serial or parallel mode of operation is in effect, and the read process is exited. If PVT line 50 is active, a test is performed at step 206 to determine whether the serial mode is in effect. If so, the SLP performs a read of busy register 32 and determines which cells 22 contain tasks at step 208. A read is then mapped at step 210 to the selected queue having a predetermined relationship with a particular cell. The contents of read register 42 and write register 40 are tested at step 212 for equality. If they are equal, ZERO is returned to the requesting SLP at step 214 signaling that no valid task is available, and the process is exited. If the contents of the two registers are not equal, processing continues at step 218, as described below. If the test performed at step 206 indicates that the serial mode is not in effect, then the following steps associated with the parallel mode occur. The SLP performs a read of task register 26 which returns a pointer to the highest priority TCB in the system. This is accomplished in the following manner. At step 216, the contents of the task register 26 are used to determine which cell 22 has the highest priority. The appropriate SEL line 56 to that cell is raised in step 218 and the read operation is signaled on the CMD line 54 at step 220.

This causes the contents of read register 42 in the selected cell 22 to be output to the memory space of queue address lines and the data from the specified queue location, representing a pointer to a TCB, is read at step 222. The queue location from which the read has occurred is set to ZERO at step 224 and the contents of read register 42 are incremented by the adder circuit 44 at step 226. The compare and zero logic 46 compares the output of adder circuit 44 to the upper boundary at step 228, and, if that output is greater than or equal to the upper boundary, read register 42 is loaded with the lower boundary at step 230 and the process continues at step 232 where compare and zero logic 46 compares the contents of read register 42 to write register 40. If they are equal, at step 234 PVT line 50 and MTB line 52 are set inactive for that cell 22 and the process continues at step 238. If they are not equal, PVT line 50 and MTB line 52 are set active for that cell 22 at step 236. If the serial mode is in effect, as determined at step 238, the MUX 24 decodes the MTB lines 52 from the cells 22 at step 240 and updates this status in the appropriate bit in busy register 32 at step 242 and continues the process at step 248. If the parallel mode is in effect, the MUX 24 decodes the MTB lines 52 from the cells 22 at step 244 to determine the highest priority. That cell number is stored in task register 26 in step 246 and is used for the next read operation. At step 248 the pointer data is returned to the requesting SLP which then uses the pointer data to retrieve a TCB for execution at step 250.

Although various elements in the previously described embodiments of this invention have been disclosed with reference to particular types of hardware, it should be understood that the functions performed by these hardware elements may also be performed in appropriate cases by other types of hardware, such as, for example, by registers, logic circuits and latches, and that this invention is not limited by reference to the specific hardware elements disclosed. Furthermore, the embodiments described above are not to be construed as the only possible implementations of this invention. Other embodiments are possible so long as the functions described above are properly performed.

What is claimed is:

1. A device for managing one or more scheduling queues which schedule the execution of multiple tasks and events in a computer system having at least one scheduling processor for scheduling individual tasks and events, at least one slave processor for executing such tasks and events and a shared memory including at least one area for storing at least one circular first-in-first-out random access memory queue comprised of multiple, sequential memory locations and at least one area for storing at least one task control block comprising:

first scheduler means for managing tasks awaiting execution; and second scheduler means for managing tasks the execution of which has been completed, said first scheduler means and said second scheduler means each further comprising:

at least one cell means for storing and retrieving pointers to the location of task control blocks in the shared memory wherein each of said cell means communicates directly with one designated circular random access memory queue in which one memory location is used to store one such pointer; and routing means communicating both with said cell means and with either one scheduling processor or one slave processor for receiving task control block pointer read and write request from such processor and for routing such request to one of said cell means.

2. The device of claim 1 wherein each said cell means is comprised of:

read means for retrieving a pointer from a memory location in the circular random access memory queue with which said cell means communicates indicating the location in the shared memory of the oldest task control block scheduled in that queue;

write means for storing a pointer to a task control block into the next empty memory location in the circular random access memory queue with which said cell means communicates.

3. The device of claim 1 wherein the circular random access memory queue in the shared memory with which each said cell means communicates is designated based on a matching of priority levels between said cell means and said queue if the device is operating in a parallel mode and on a predetermined association between said cell means and an external device or process if the device is operating in a serial mode.

4. The device of claim 2 wherein said cell means is further comprised of:

adder means for incrementing the contents of said read means and said write means; and compare and zero means for comparing the contents of said read means with the contents of said write means, for verifying all writes to queues, and for managing the upper and lower boundaries of the address space of the memory queue managed by said cell means.

5. The device of claim 1 wherein said routing means is comprised of:

multiplexor means for determining which of said cell means has an active queue element and which of said cell means has the highest priority; and task means for storing the identity of that cell means having the highest priority as determined by said multiplexor means;

base address means for determining the upper and lower boundary of each of the memory queues;

configuration means for determining whether said cell means is operating in a parallel or serial mode, whether pulsed or latched interrupts are to be furnished and the size of each queue;

busy means for indicating which cells have pending tasks when the serial mode is in effect; and cause means for storing the cause of a fault or interrupt in said scheduler means.

6. A method, performed by a computer system including at least two scheduling units each having at least one cell therein for managing a memory queue associated with that cell and a write register containing a value representing a memory location in that queue, at least one processor for scheduling individual tasks and events, at least one processor for executing such tasks and events and a shared memory having at least one area for storing at least one circular first-in-first-out random access memory queue having multiple memory locations and at least one area for storing at least one task control block, for managing and storing a pointer to a task control block for a task which has been identified and for which a task control block containing details about the task has been built and stored in the shared memory, comprising the computer-performed steps of:

writing a pointer to the task control block to one of the scheduling units;

routing that pointer to a selected cell within said one of the scheduling units;

determining if the writing step is valid and, if so, storing the pointer in the memory location designated by the value contained in the write register and, if not, aborting the write operation;

resetting the contents of the write register in the cell based on the availability of free memory locations in the queue;

signaling the presence and priority of other valid tasks;

making manual adjustments to the computer system in the event an invalid writing step has been attempted.

7. A method, performed by a computer system including at least two scheduling units each having at least one cell therein for managing a memory queue associated with that cell and a read register containing a value representing a memory location in that queue, at least one processor for scheduling individual tasks and events, at least one processor for executing such tasks and events and a shared memory having at least one area for storing at least one circular first-in-first-out random access memory queue having multiple memory locations and at least one area for storing at least one task control block, for managing and enabling a requesting processor to retrieve a task control block, comprising the computer-performed steps of:

requesting one of the scheduling units to retrieve a pointer to a task control block based on a read request;

determining whether there are any valid tasks, pointers to which can be retrieved, and, if not, signaling the absence of such valid tasks and exiting the process;

routing the read request to a cell selected on the basis of the mode, parallel or serial, in which such cell is operating if there are valid tasks;

accessing a memory location in the queue with which that cell is associated specified by the value contained in the read register of that cell;

retrieving a pointer from the accessed memory location in the queue which pointer indicates the location in the shared memory of a task control block;

setting the contents of the accessed memory location in the queue specified by the value in the read register of the cell to zero;

resetting the value of the read register in the cell;

testing whether the particular memory location in the queue which was accessed was empty and, if so, notifying said one of the scheduling units of that status;

preparing said one of the scheduling units for routing the next read request to the proper cell;

returning the value of the retrieved pointer to the requesting processor; and retrieving the task control block from the location in the shared memory specified by the pointer.

8. A system for managing one or more scheduling queues which schedule the execution of multiple tasks and events in a distributed multiprocessing computer system comprising:

at least one scheduling processing module;

at least one other processing module acting in a slave capacity to said scheduling processor module;

a shared global memory array including:

first realtime hardware scheduler means for managing queues related to tasks and events awaiting processing wherein said scheduler means may operate in either a parallel or a serial mode; and second realtime hardware scheduler means for managing queues related to completed tasks and events wherein said scheduler means may operate in either a parallel or a serial mode; and a first shared memory area for storing task control blocks;

a second shared memory area for storing at least one circular random access memory queue managed by one of said scheduler means wherein each said queue is associated either with a particular execution priority level or with a particular external device or application depending on whether the scheduler means managing that queue is operating, respectively, in a parallel or serial mode;

a third shared memory area for storing other data;

a bus structure interconnecting all of said processing modules and said shared global memory array.

9. The system of claim 8 wherein each of said realtime hardware scheduler means includes a cell means communicating with a specified memory queue for writing a pointer to the location of a task control block in the first shared memory area into the next empty memory location in the specified memory queue.

10. The system of claim 8 wherein each of said realtime hardware scheduler means includes a cell means communicating with a specified memory queue for reading therefrom a pointer to the location of the oldest task control block a pointer to which is stored in said queue.

* * * * *